United States Patent
Kimura et al.

(10) Patent No.: US 10,781,300 B2
(45) Date of Patent: Sep. 22, 2020

(54) RUBBER COMPOSITION FOR TIRES

(71) Applicant: The Yokohama Rubber Co., LTD., Minato-ku, Tokyo (JP)

(72) Inventors: Kazushi Kimura, Hiratsuka (JP); Satoshi Mihara, Hiratsuka (JP); Hirokazu Kageyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 90 days.

(21) Appl. No.: 16/077,399

(22) PCT Filed: Feb. 9, 2017

(86) PCT No.: PCT/JP2017/004715
§ 371 (c)(1),
(2) Date: Aug. 10, 2018

(87) PCT Pub. No.: WO2017/138603
PCT Pub. Date: Aug. 17, 2017

(65) Prior Publication Data
US 2019/0048174 A1 Feb. 14, 2019

(30) Foreign Application Priority Data

Feb. 12, 2016 (JP) ................................ 2016-024785

(51) Int. Cl.
| | |
|---|---|
| *C08L 9/06* | (2006.01) |
| *C08K 3/04* | (2006.01) |
| *C08G 18/44* | (2006.01) |
| *C08K 3/00* | (2018.01) |
| *C08G 18/76* | (2006.01) |
| *C08G 18/24* | (2006.01) |
| *B60C 1/00* | (2006.01) |
| *C08L 101/02* | (2006.01) |
| *C08G 18/50* | (2006.01) |
| *C08G 18/32* | (2006.01) |
| *C08G 81/02* | (2006.01) |
| *C08J 3/12* | (2006.01) |
| *C08G 18/08* | (2006.01) |
| *C08G 81/00* | (2006.01) |
| *C08G 18/34* | (2006.01) |
| *C08G 18/81* | (2006.01) |
| *C08K 3/013* | (2018.01) |
| *C08L 9/02* | (2006.01) |
| *C08L 81/02* | (2006.01) |
| *C08L 81/04* | (2006.01) |

(52) U.S. Cl.
CPC ...... *C08L 9/06* (2013.01); *B60C 1/00* (2013.01); *B60C 1/0016* (2013.01); *B60C 1/0025* (2013.01); *C08G 18/0823* (2013.01); *C08G 18/246* (2013.01); *C08G 18/3206* (2013.01); *C08G 18/348* (2013.01); *C08G 18/44* (2013.01); *C08G 18/5072* (2013.01); *C08G 18/7642* (2013.01); *C08G 18/7671* (2013.01); *C08G 18/8116* (2013.01); *C08G 81/00* (2013.01); *C08G 81/025* (2013.01); *C08J 3/12* (2013.01); *C08K 3/00* (2013.01); *C08K 3/013* (2018.01); *C08K 3/04* (2013.01); *C08L 9/02* (2013.01); *C08L 81/02* (2013.01); *C08L 81/04* (2013.01); *C08L 101/02* (2013.01); *C08G 2380/00* (2013.01); *C08J 2353/00* (2013.01); *C08J 2369/00* (2013.01); *C08J 2371/02* (2013.01); *C08K 2201/005* (2013.01); *C08K 2201/009* (2013.01)

(58) Field of Classification Search
CPC .. C08G 18/10; C08G 18/7671; C08G 18/246; C08K 3/013; B60C 1/0025; C08L 9/06
USPC ........................................................ 523/155
See application file for complete search history.

(56) References Cited

U.S. PATENT DOCUMENTS

| | | | |
|---|---|---|---|
| 2014/0100321 A1 | 4/2014 | Maejima et al. | |
| 2016/0237253 A1 | 8/2016 | Kakubo et al. | |

FOREIGN PATENT DOCUMENTS

| | | |
|---|---|---|
| JP | 2014-055230 | 3/2014 |
| JP | 2014-62141 | * 4/2014 |
| JP | 2014-062141 | 4/2014 |
| JP | 2014-062167 | 4/2014 |
| JP | 2015-067635 | 4/2015 |
| JP | 2015-067636 | 4/2015 |
| JP | 2015-221855 | 12/2015 |
| WO | WO 2012/144605 | 10/2012 |
| WO | WO 2015/046154 | 4/2015 |

OTHER PUBLICATIONS

Machine translation of JP 2014-62141 (Year: 2014).*
International Search Report for International Application No. PCT/JP2017/004715 dated Apr. 4, 2017, 4 pages, Japan.

* cited by examiner

*Primary Examiner* — Doris L Lee
(74) *Attorney, Agent, or Firm* — Thorpe North & Western

(57) ABSTRACT

Provided is a rubber composition containing from 1 to 50 parts by mass of an organic microparticle having an average particle size of 0.001 to 100 μm and having a crosslinked structure per 100 parts by mass of a diene rubber, the organic microparticle being a crosslinked microparticle of a copolymer formed from at least two types of segments having repeating units that are different each other, the at least two types of segments being formed from an oligomer or prepolymer having a functional group and having a molecular weight of 500 to 20000, and the functional group forming a crosslinked structure between the at least two types of segments.

12 Claims, 1 Drawing Sheet

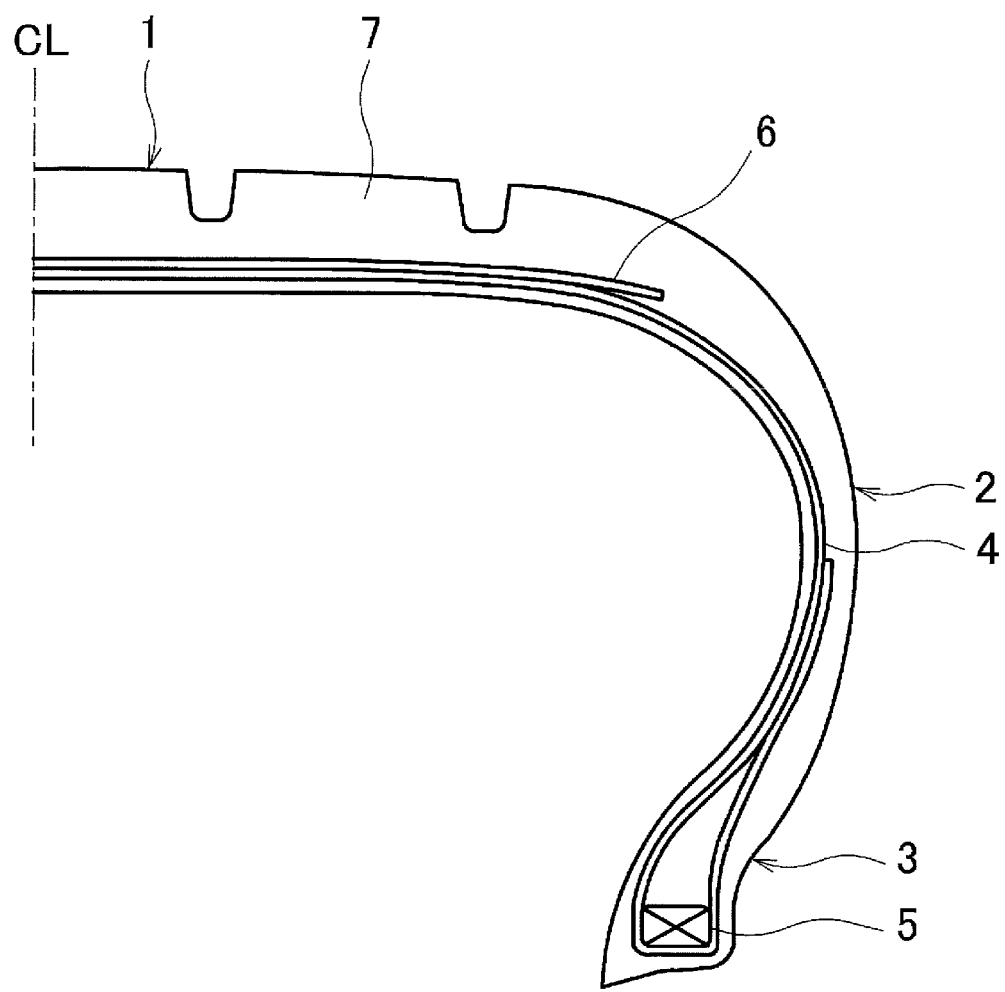

RUBBER COMPOSITION FOR TIRES

TECHNICAL FIELD

The present technology relates to a rubber composition for tires, the rubber composition containing a novel organic microparticle having a crosslinked structure.

BACKGROUND ART

In recent years, pneumatic tires with higher performance have been developed, and various studies have been carried out while enhancement in tensile stress, tensile strength at break, and tensile elongation at break of rubber compositions for tires has been demanded.

Japan Unexamined Patent Publication Nos. 2015-067635 and 2015-067636 propose blending of three-dimensionally crosslinked microparticles in rubber compositions for tires. The three-dimensionally crosslinked microparticles are advantageous to enhance performance on ice and wear resistance of studless tires due to the small JIS (Japanese Industrial Standard) A hardness. On the other hand, when the three-dimensionally crosslinked microparticles are blended, there is a problem that it is not possible to improve and enhance tensile stress, tensile strength at break, and tensile elongation at break of rubber compositions.

SUMMARY

The present technology provides a rubber composition for tires, by which tensile stress, tensile strength at break, and tensile elongation at break are enhanced equal to or beyond conventional levels.

A rubber composition contains from 1 to 100 parts by mass of an organic microparticle having an average particle size of 0.001 to 100 μm and having a crosslinked structure per 100 parts by mass of a diene rubber, the organic microparticle being a crosslinked microparticle of a copolymer formed from at least two types of segments having repeating units that are different each other, the at least two types of segments being formed from an oligomer or prepolymer having a functional group and having a molecular weight from 500 to 20000, and the functional group forming a crosslinked structure between the at least two types of segments.

According to the rubber composition for tires according to an embodiment of the present technology, tensile stress, tensile strength at break, and tensile elongation at break can be enhanced equal to or beyond levels in the related art because a novel organic microparticle having an average particle size of 0.001 to 100 μm and having a crosslinked structure is blended.

In an embodiment of the present technology, at least one of the segments may have at least one selected from the group consisting of a sulfur atom, a mercapto group, a thioether bond, and a polysulfide bond.

The rubber composition for tires may further contain from 1 to 100 parts by mass of carbon black and/or a white filler per 100 parts by mass of the diene rubber.

The crosslinked structure of the organic microparticle may be a crosslinked structure formed by allowing the functional group to crosslink in between the at least two types of segments in a dispersion medium formed from water or an organic solvent. Furthermore, the crosslinked structure of the organic microparticle may be formed by allowing the functional group to crosslink in between the at least two types of segments in a dispersion medium formed from a rubber component. Note that the rubber component may be the same type as at least one part of the diene rubber.

The rubber composition for tires according to an embodiment of the present technology can be used in pneumatic tires, and in tire tread portions in particular.

BRIEF DESCRIPTION OF DRAWINGS

FIG. 1 is a cross-sectional view in a tire meridian direction that illustrates an example of an embodiment of a pneumatic tire in which a rubber composition for tires according to an embodiment of the present technology is used.

DETAILED DESCRIPTION

A pneumatic tire illustrated in FIG. 1 has a tread portion 1, a sidewall portion 2, and a bead portion 3. A carcass layer 4 is mounted between the left and right bead portions 3 and 3, and each end of the carcass layer 4 is folded over from the inside to the outside of the tire around a bead core 5. A belt layer 6 is disposed on the outer side in the tire radial direction of the carcass layer 4 in the tread portion 1, and a tread rubber 7 is disposed on the outside of the belt layer 6. The rubber composition for tires according to an embodiment of the present technology can be advantageously used in the tread rubber 7 or the sidewall portion 2. Among these, application in the tread rubber 7 is particularly preferred.

In the rubber composition for tires according to an embodiment of the present technology, examples of the diene rubber include natural rubber (NR), isoprene rubber (IR), styrene-butadiene rubber (SBR), butadiene rubber (BR), acrylonitrile butadiene rubber (NBR), butyl rubber (IIR), chlorinated butyl rubber (Cl-IIR), and brominated butyl rubber (Br-IIR), chloroprene rubber (CR), and a single type or a discretionary blend of these can be used. Furthermore, an olefin rubber, such as ethylene propylene diene rubber (EPDM), styrene isoprene rubber, styrene isoprene butadiene rubber, and isoprene butadiene rubber, may be blended. Among these, natural rubber, styrene-butadiene rubber, butadiene rubber, and butyl rubber are preferable as the diene rubber.

The rubber composition for tires according to an embodiment of the present technology contains an organic microparticle having a crosslinked structure in the diene rubber described above. By blending the organic microparticle, tensile stress, tensile strength at break, and tensile elongation at break of the rubber composition for tires can be enhanced equal to or beyond levels in the related art.

The compounded amount of the organic microparticle is from 1 to 100 parts by mass, preferably from 2 to 80 parts by mass, more preferably from 4 to 60 parts by mass, and even more preferably from 6 to 40 parts by mass, per 100 parts by mass of the diene rubber. When the compounded amount of the organic microparticle is less than 1 part by mass, effect of enhancing tensile stress, tensile strength at break, and tensile elongation at break may not be sufficiently achieved. Furthermore, when the compounded amount of the organic microparticle is greater than 100 parts by mass, processability is deteriorated, and cost of the rubber composition for tires is increased.

In an embodiment of the present technology, the average particle size of the organic microparticles is from 0.001 to 100 μm, preferably from 0.002 to 20 μm, more preferably from 0.005 to 5 μm, and even more preferably from 0.01 to 1 μm. When the average particle size of the organic microparticles is less than 0.001 μm, dispersibility in the diene rubber is reduced. Furthermore, when the average particle size of the organic microparticles is greater than 100 µm, tensile stress, tensile strength at break, and tensile elongation at break cannot be sufficiently enhanced. In the present specification, the average particle size refers to an average value of equivalent circle diameters measured by using a laser microscope. For example, the measurement can be performed by using the laser diffraction scattering particle size distribution analyzer LA-300 (available from Horiba, Ltd.) or the laser microscope VK-8710 (available from Keyence Corporation).

The organic microparticle is formed from a copolymer having a functional group, and the crosslinked structure is formed via the functional group. The copolymer constituting the organic microparticle is formed from at least two types of segments having repeating units that are different each other, and each of these segments is formed from an oligomer or prepolymer having a functional group and having a molecular weight of 500 to 20000.

The copolymer constituting the organic microparticle is formed from at least two types of segments, and the repeating units of these segments are different each other. Each of the segments is formed from an oligomer or prepolymer, and the number average molecular weight thereof is from 500 to 20000, preferably from 500 to 10000, and more preferably from 1000 to 10000. When the number average molecular weight of the oligomer and the prepolymer is less than 500, problems may occur in the copolymerization of the different segments. Furthermore, when the number average molecular weight of the oligomer and the prepolymer is greater than 20000, it becomes difficult to adjust the particle size. In the present specification, the number average molecular weight is measured by gel permeation chromatography (GPC) based on calibration with polystyrene standards.

The oligomer and prepolymer are hydrocarbon compounds or (co)polymers of hydrocarbon compounds having a heteroatom, and examples thereof include polyolefin-based, polyester-based, polyether-based, polycarbonate-based, poly(meth)acrylate-based, polyamide-based, polyurethane-based, and polysiloxane-based oligomers and prepolymers. These oligomers and prepolymers may be homopolymers or copolymers.

The copolymer constituting the organic microparticle contains, as its segments, at least two types of oligomer(s) and prepolymer(s) having repeating units that are different each other, and at least one type of the oligomer or the prepolymer has a functional group. The two or more types of segments can be selected without particular limitation as long as the segments can be polymerized and the combination allows the obtained copolymers to crosslink.

Furthermore, the functional group contained in the oligomer and the prepolymer may be a functional group derived from the monomer or a functional group introduced to each polymer. Examples of the type of the functional group include a carboxyl group, an epoxy group, a glycidyl group, an acyl group, a vinyl group, a (meth)acryloyl group, an acid anhydride group, a hydroxyl group, a silanol group, an alkoxysilyl group, an amino group, an isocyanate group, and a mercapto group.

The functional group contained in the oligomer and the prepolymer can constitute at least a part of the crosslinked structure that bonds in between the segments of the copolymer constituting the organic microparticle. The crosslinked structure may be a structure in which the functional group described above directly links the segments, or the functional group may form a crosslinked structure by acting on a crosslinking agent that is added separately.

In an embodiment of the present technology, the oligomer and the prepolymer preferably have at least one selected from the group consisting of a sulfur atom, a mercapto group, a thioether bond, and a polysulfide bond, in addition to the functional group described above. Furthermore, among the two or more types of segments constituting the copolymer, at least one of the segments may have at least one selected from the group consisting of a sulfur atom, a mercapto group, a thioether bond, and a polysulfide bond. Note that these sulfur atom, mercapto group, thioether bond, and polysulfide bond do not participate in the crosslinking of the copolymer constituting the organic microparticle. Furthermore, examples of the polysulfide bond include disulfide bonds, trisulfide bonds, and tetrasulfide bonds.

Examples of the oligomer or prepolymer having a mercapto group include monomercapto compounds, such as alkylmercaptan and mercaptosilane, and polymers having a mercapto group of a polyfunctional thiol compound. Furthermore, examples of the oligomer or prepolymer having a thioether bond include thioether compounds having a divalent sulfur substituted with two organic groups, thioether compounds having a trivalent sulfur substituted with three organic groups, and thioether compounds having a tetravalent sulfur substituted with four organic groups. Examples of the oligomer or prepolymer having a polysulfide bond include compounds having disulfide bonds obtained by coupling two pairs of thiols and compounds having polysulfide bonds, such as trisulfide bonds and tetrasulfide bonds. Examples of the compound having a disulfide bond include thiuram-based vulcanization accelerators, thiazole-based vulcanization accelerators, and liquid polysulfide polymers. Examples of the compound having a tetrasulfide bond include silane coupling agents, such as bistriethoxysilylpropyl tetrasulfide.

The organic microparticle having the average particle size of 0.001 to 100 µm blended in the rubber composition for tires can be obtained by subjecting a polymer, to which at least two types of repeating units that differ each other of an oligomer or prepolymer having a functional group and having a molecular weight of 500 to 20000 have been added, to crosslinking by using the functional group in a dispersion medium formed from water, an organic solvent, or a diene rubber; or by forming a polymer by adding in these dispersion media and then crosslinking the polymer.

When the organic microparticle is prepared, the crosslinked structure is preferably formed by crosslinking the segments to be bonded via the functional group of the oligomer and the prepolymer in a dispersion medium formed from water or an organic solvent.

Alternatively, when the organic microparticle is prepared, the crosslinked structure is preferably formed by crosslinking the segments to be bonded via the functional group of the oligomer and the prepolymer in a dispersion medium formed from a rubber component. Note that the rubber component used in the dispersion medium may be the type that is the same as at least one part of the diene rubber constituting the rubber composition for tires.

In an embodiment of the present technology, in addition to the functional group described above, a crosslinking catalyst, a crosslinking agent, and a solvent (dispersion medium) can be used for the crosslinking. The crosslinking catalyst and the crosslinking agent can be selected as appropriate depending on the type of the functional group. As the dispersion medium, water, organic solvents, and diene rubbers are preferable. Examples of the organic solvent include aliphatic hydrocarbons, such as n-pentane, isopentane, neopentane, n-hexane, 2-methylpentane, 3-methylpentane, 2,2- dimethylbutane, 2,3-dimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, and isooctane; alicyclic hydrocarbons, such as cyclopentane, cyclohexane, and methylcyclopentane; aromatic hydrocarbons, such as xylene, benzene, and toluene; and terpene-based organic solvents, such as α-pinene, β-pinene, and limonene.

Furthermore, compounding agents, such as surfactants, emulsifiers, dispersants, and silane coupling agents, can be used as necessary in the crosslinking.

The rubber composition for tires according to an embodiment of the present technology may contain carbon black and/or a white filler. By allowing the organic microparticle having the crosslinked structure to be blended together with the carbon black and/or the white filler, superior tensile stress, tensile strength at break, and tensile elongation at break of the rubber composition for tires can be achieved.

Examples of the carbon black include furnace carbon blacks, such as SAF (Super Abrasion Furnace), ISAF (Intermediate Super Abrasion Furnace), HAF (High Abrasion Furnace), FEF (Fast Extrusion Furnace), GPE (General Purpose Furnace), and SRF (Semi-Reinforcing Furnace), and one of these can be used alone, or two or more types can be used in combination.

The nitrogen adsorption specific surface area ($N_2SA$) of the carbon black is not particularly limited but is preferably from 10 to 300 $m^2/g$, more preferably from 20 to 200 $m^2/g$, and even more preferably from 50 to 150 $m^2/g$. In the present specification, the nitrogen adsorption specific surface area is measured in accordance with JIS K 6217-2.

Examples of the white filler include silica, calcium carbonate, magnesium carbonate, talc, clay, alumina, aluminum hydroxide, titanium oxide, and calcium sulfate. Among these, silica is preferable. One of these white fillers can be used alone, or two or more types of these white fillers can be used in combination.

Examples of the silica include wet silica (hydrous silicic acid), dry silica (silicic anhydride), calcium silicate, aluminum silicate. Among these, wet silica is preferable. One of these silicas can be used alone, or two or more types of these silicas can be used in combination.

The silica compounded in the rubber composition for tires preferably has the CTAB (cetyltrimethylammonium bromide) adsorption specific surface area from 50 to 300 $m^2/g$, more preferably from 70 to 250 $m^2/g$, and even more preferably from 90 to 200 $m^2/g$. The CTAB adsorption specific surface area of the silica is measured in accordance with JIS K 6217-3.

In an embodiment of the present technology, the compounded amount of the carbon black and/or the white filler is, in terms of the total amount of the carbon black and the white filler, preferably from 1 to 100 parts by mass, more preferably from 5 to 90 parts by mass, and even more preferably from 10 to 80 parts by mass, per 100 parts by mass of the diene rubber.

When the silica is blended in the rubber composition for tires, it is preferable to blend a silane coupling agent together with the silica because dispersibility of the silica in the diene rubber can be enhanced. The compounded amount of the silane coupling agent is preferably from 3 to 15 mass %, and more preferably from 4 to 10 mass %, relative to the compounded amount of the silica. When the compounded amount of the silane coupling agent is less than 3 mass %, dispersibility of the silica cannot be sufficiently enhanced. Furthermore, when the compounded amount of the silane coupling agent is greater than 15 mass %, the silane coupling agents aggregate and condense, and the desired effects cannot be obtained.

The type of silane coupling agent to be used is not particularly limited, but sulfur-containing silane coupling agents are preferable. Examples of the sulfur-containing silane coupling agent include bis-(3-triethoxysilylpropyl) tetrasulfide, bis-(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

In the rubber composition for tires, compounding agents that are typically used in rubber compositions for tires for industrial use, such as vulcanizing agents, vulcanization accelerators, vulcanization aids, rubber reinforcing agents, softeners (plasticizers), anti-aging agents, processing aids, activators, mold release agents, heat-resistance stabilizers, weathering stabilizers, antistatic agents, coloring agents, lubricants, and thickeners, can be added. As long as the object of the present technology is not impaired, these compounding agents can be applied in compounded amounts that are typically used, and can be added, kneaded, or mixed by a typical preparation method.

The rubber composition for tires according to an embodiment of the present technology can constitute a tread portion or a sidewall portion of a pneumatic tire. Among these, the rubber composition preferably constitutes a tire tread portion. A pneumatic tire, in which the rubber composition for tires according to an embodiment of the present technology is used in these portions, can achieve improved tire durability performance equal to or beyond levels in the related art.

The present technology is further described below by Examples. However, the scope of the present technology is not limited to these Examples.

EXAMPLES

Production Example 1

Production of Microparticle 1

160 g of polycarbonate diol (T6001, available from Asahi Kasei Corporation; number average molecular weight: 1000) and 80 g of 4,4'-diphenylmethane diisocyanate (Millionate Mont., available from Nippon Polyurethane Industry Co., Ltd.; number average molecular weight: 250) were reacted at 80° C. for 5 hours to obtain a polycarbonate urethane prepolymer end-capped with isocyanate. To this, 800 g of polyether having a disulfide bond (SULBRID 12, available from Daito Sangyo Co., Ltd.; number average molecular weight: 2500) and 800 g of methyl ethyl ketone were mixed and then reacted at 70° C. for 5 hours. Thereafter, the mixture was cooled to room temperature. This reaction product of the polycarbonate and the disulfide bond-containing polyether was used as the "reaction product 1".

Separately from this, in 40 g of methyl isobutyl ketone (MIBK, reagent), 24 g of dimethylol butanoic acid (DMBA, reagent) and 18 g of triethylamine (TEA, reagent) were mixed and dissolved, and then 64 g of xylylene diisocyanate (XDI, reagent) and the reaction product 1 described above were added and agitated for 5 minutes. To this, 1600 g of water and 60 g of sorbitan acid-based surfactant (TW-0320V, available from Kao Corporation) were mixed, and the mixture was placed in a high speed dissolver mixer and agitated at a rotational speed of 1000 rpm for 10 minutes.

Thereafter, the temperature was gradually increased to 70° C. and agitation was continued for 1 hour to obtain a milky white emulsion solution. This solution was applied on a glass plate, and water was vaporized. When observation was performed by using a laser microscope, it was confirmed that spherical microparticles of approximately 5μ were produced. The temperature was increased to 80° C. to vaporize water while this milky white emulsion solution was agitated, thereby obtaining a white powder. These were used as "microparticles 1".

Production Example 2

Production of Microparticle 2

200 g of polycarbonate diol (T6001, available from Asahi Kasei Corporation; number average molecular weight: 1000) and 100 g of 4,4'-diphenylmethane diisocyanate (Millionate Mont., available from Nippon Polyurethane Industry Co., Ltd.; number average molecular weight: 250) were reacted at 80° C. for 5 hours to obtain a polycarbonate urethane prepolymer end-capped with isocyanate. To this, 1000 g of methyl ethyl ketone (MEK, reagent) and 1000 g of polyisoprene oligomer (Polyip, available from Idemitsu Kosan Co., Ltd.; number average molecular weight: 2500) were additionally mixed and reacted at 70° C. for 8 hours to obtain the "reaction product 2".

Furthermore, separately from this, 20 g of trimethylolpropane (TMP, available from Mitsubishi Gas Chemical Co., Ltd.), 20 g of methyl isobutyl ketone (MIBK, reagent), and 23 g of 2-isocyanate ethyl methacrylate (MOI, available from Showa Denko K.K.; number average molecular weight: 155) were mixed and reacted at 80° C. for 4 hours to obtain the "reaction product 3".

Thereafter, in all the amount of the reaction product 2 described above, 10 g of methyl isobutyl ketone (MIBK, reagent), 8.3 g of dimethylol butanoic acid (DMBA, reagent), and 6 g of triethylamine (TEA, reagent) were completely dissolved to obtain the "mixture 1".

To this mixture 1, 75 g of xylylene diisocyanate (XDI, reagent) and all the amount of the reaction product 3 were mixed and agitated for 10 minutes.

Thereafter, 1500 g of water, 60 g of sorbitan acid-based surfactant (TW-0320V, available from Kao Corporation), 80 g of pentaerythritol tetrakis(3-mercaptobutylate) (Karenz Mont., available from Showa Denko K.K.), and 0.5 g of dibutyltin dilaurate (DBTL, reagent) were placed in a high speed dissolver mixer and agitated at a rotational speed of 1000 rpm for 30 minutes. Thereafter, the temperature was gradually increased to 70° C. and agitation was further continued for 1 hour to obtain a milky white emulsion solution. This solution was applied on a glass plate, and water was vaporized. When observation was performed by using a laser microscope, it was confirmed that spherical microparticles of approximately 5μ were produced. The temperature was increased to 80° C. to vaporize water while this milky white emulsion solution was agitated, thereby obtaining a white powder. These were used as "microparticles 2".

Production Example 3

Pproduction of Microparticle 3

140 g of polycarbonate diol (T6001, available from Asahi Kasei Corporation; number average molecular weight: 1000) and 70 g of 4,4'-diphenylmethane diisocyanate (Millionate Mont., available from Nippon Polyurethane Industry Co., Ltd.; number average molecular weight: 250) were reacted at 80° C. for 5 hours to obtain a polycarbonate urethane prepolymer end-capped with isocyanate. To this, 530 g of polyether having a disulfide bond (SULBRID 12, available from Daito Sangyo Co., Ltd.; number average molecular weight: 2500) and 560 g of methyl ethyl ketone were mixed and then reacted at 80° C. for 5 hours. Thereafter, the mixture was cooled to room temperature. This reaction product of the polycarbonate and the disulfide bond-containing polyether was used as the "reaction product 4".

Separately from this, in 20 g of methyl isobutyl ketone (MIBK, reagent), 12 g of dimethylol butanoic acid (DMBA, reagent) and 9 g of triethylamine (TEA, reagent) were mixed and dissolved, and then 35 g of xylylene diisocyanate (XDI, reagent) and the reaction product 4 described above were added and agitated for 5 minutes. To this, 1000 g of water and 50 g of sorbitan acid-based surfactant (TW-0320V, available from Kao Corporation) were mixed, and the mixture was placed in a high speed dissolver mixer and agitated at a rotational speed of 1000 rpm for 10 minutes. Thereafter, the temperature was gradually increased to 60° C. and agitation was continued for 1 hour to obtain a milky white emulsion solution. This solution was applied on a glass plate, and water was vaporized. When observation was performed by using a laser microscope, it was confirmed that spherical microparticles of approximately 5μ were produced. The temperature was increased to 80° C. to vaporize water while this milky white emulsion solution was agitated, thereby obtaining a white powder. These were used as "microparticles 3".

Production Example 4

Pproduction of Microparticle 4 (Comparative Microparticle)

200 g of polycarbonate diol (T6001, available from Asahi Kasei Corporation; number average molecular weight: 1000) and 100 g of 4,4'-diphenylmethane diisocyanate (Millionate Mont., available from Nippon Polyurethane Industry Co., Ltd.; number average molecular weight: 250) were reacted at 80° C. for 5 hours to obtain a polycarbonate urethane prepolymer end-capped with isocyanate (reaction product 5).

Thereafter, to 132 g of the obtained polycarbonate urethane prepolymer end-capped with isocyanate (reaction product 5), 10.5 g of methyl isobutyl ketone (MIBK), 6.0 g of dimethylol butanoic acid (DMBA), and 4.5 g of triethylamine (TEA) were mixed and agitated for 10 minutes.

Thereafter, 250 g of water, 10.0 g of sorbitan acid-based surfactant (TW-0320V, available from Kao Corporation), and 0.15 g of dibutyltin dilaurate (DBTL) were added and agitated at a dissolver rotational speed of 1000 rpm for 10 minutes by using an agitator equipped with a dissolver. Thereafter, the temperature was gradually increased to 70° C. and agitation was continued for 1 hour to obtain a milky white emulsion solution. This solution was applied on a glass plate, and water was vaporized. When observation was performed by using a laser microscope, it was confirmed that spherical microparticles of approximately 5μ were produced. The temperature was increased to 80° C. to vaporize water while this milky white emulsion solution was agitated, thereby obtaining a white powder. These were used as "microparticles 4 (comparative microparticles)".

Compounding ingredients other than sulfur and vulcanization accelerators were weighed according to each of the rubber compositions for tires shown in Table 1 (Examples 1 to 5, Standard Example 1, and Comparative Examples 1 and 2). These compounding ingredients were kneaded in a 1.7 L sealed Banbury mixer for 5 minutes. Then, a master batch was discharged at a temperature of 150° C. and cooled at room temperature. The master batch was then fed to a heating roller, and the sulfur and the vulcanization accelerator were then added to the master batch and mixed, and thus each of the 8 types of rubber compositions for tires was prepared. Note that, since SBR was an oil extended product, the net amount of the SBR which did not include the amount of the oil-extending component was shown in parentheses. By using each of the obtained 8 types of rubber compositions for tires, a vulcanized rubber sheet was prepared in a mold having a predetermined shape at 160° C. for 20 minutes. Tensile testing was performed by the following method to evaluate tensile characteristics (tensile stress, tensile strength at break, and tensile elongation at break).

Tensile Test

A dumbbell-shaped JIS No. 3 test piece was cut out from the obtained vulcanized rubber sheet in accordance with JIS K 6251. By using the obtained test piece, tensile stress at 100% deformation, tensile stress at 300% deformation, tensile strength at break, and tensile elongation at break were measured in accordance with JIS K 6251. The obtained results are shown in Table 1 as index values with each of the value of Standard Example 1 expressed as an index value of 100. A larger index value indicates superior tensile stress at 100% deformation, superior tensile stress at 300% deformation, superior tensile strength at break, or superior tensile elongation at break.

TABLE 1

|  |  | Standard Example 1 | Comparative Example 1 | Comparative Example 2 | Example 1 |
|---|---|---|---|---|---|
| SBR | Part by mass | 103 (75) | 103 (75) | 103 (75) | 103 (75) |
| BR | Part by mass | 25 | 25 | 25 | 25 |
| Silica | Part by mass | 80 | 70 | 70 | 70 |
| Carbon black | Part by mass | 10 | 10 | 10 | 10 |
| Microparticle 1 | Part by mass |  |  |  | 10 |
| Microparticle 2 | Part by mass |  |  |  |  |
| Microparticle 3 | Part by mass |  |  |  |  |
| Microparticle 4 (comparative microparticle) | Part by mass |  | 10 | 20 |  |
| Silane coupling agent | Part by mass | 5.0 | 5.0 | 5.0 | 5.0 |
| Zinc oxide | Part by mass | 3.0 | 3.0 | 3.0 | 3.0 |
| Stearic acid | Part by mass | 2.0 | 2.0 | 2.0 | 2.0 |
| Anti-aging agent | Part by mass | 2.0 | 2.0 | 2.0 | 2.0 |
| Sulfur | Part by mass | 1.5 | 1.5 | 1.5 | 1.5 |
| Vulcanization accelerator 1 | Part by mass | 2.0 | 2.0 | 2.0 | 2.0 |
| Vulcanization accelerator 2 | Part by mass | 0.5 | 0.5 | 0.5 | 0.5 |
| Oil | Part by mass | 10 | 10 | 10 | 10 |
| Tensile stress at 100% deformation | Index value | 100 | 95 | 91 | 109 |
| Tensile stress at 300% deformation | Index value | 100 | 86 | 80 | 106 |
| Tensile strength at break | Index value | 100 | 80 | 70 | 104 |
| Tensile elongation at break | Index value | 100 | 76 | 68 | 110 |

|  |  | Example 2 | Example 3 | Example 4 | Example 5 |
|---|---|---|---|---|---|
| SBR | Part by mass | 103 (75) | 103 (75) | 103 (75) | 103 (75) |
| BR | Part by mass | 25 | 25 | 25 | 25 |
| Silica | Part by mass | 70 | 70 | 70 | 70 |
| Carbon black | Part by mass | 10 | 10 | 10 | 10 |
| Microparticle 1 | Part by mass |  | 20 |  |  |
| Microparticle 2 | Part by mass | 10 |  | 20 |  |
| Microparticle 3 | Part by mass |  |  |  | 20 |
| Microparticle 4 (comparative microparticle) | Part by mass |  |  |  |  |
| Silane coupling agent | Part by mass | 5.0 | 5.0 | 5.0 | 5.0 |
| Zinc oxide | Part by mass | 3.0 | 3.0 | 3.0 | 3.0 |
| Stearic acid | Part by mass | 2.0 | 2.0 | 2.0 | 2.0 |
| Anti-aging agent | Part by mass | 2.0 | 2.0 | 2.0 | 2.0 |
| Sulfur | Part by mass | 1.5 | 1.5 | 1.5 | 1.5 |
| Vulcanization accelerator 1 | Part by mass | 2.0 | 2.0 | 2.0 | 2.0 |
| Vulcanization accelerator 2 | Part by mass | 0.5 | 0.5 | 0.5 | 0.5 |
| Oil | Part by mass | 10 | 10 | 10 | 10 |
| Tensile stress at 100% deformation | Index value | 118 | 127 | 141 | 132 |
| Tensile stress at 300% deformation | Index value | 113 | 119 | 124 | 117 |

TABLE 1-continued

| | | | | | |
|---|---|---|---|---|---|
| Tensile strength at break | Index value | 106 | 113 | 117 | 114 |
| Tensile elongation at break | Index value | 105 | 104 | 105 | 104 |

The types of raw materials used in Table 1 are shown below.

- SBR: styrene-butadiene rubber having a hydroxy group; trade name: Tufdene E581 (available from Asahi Kasei Chemicals Corporation); oil extended product in which 37.5 parts by mass of extender oil was added per 100 parts by mass of SBR
- BR: butadiene rubber (Nipol 1220, available from Zeon Corporation)
- Silica: 1165MP (available from Solvay)
- Carbon black: SEAST N (available from Tokai Carbon Co., Ltd.)
- Microparticles 1 to 3: microparticles 1 to 3 obtained by Production Examples 1 to 3 described above
- Microparticle 4: microparticle 4 obtained by Production Example 4 described above (comparative microparticle)
- Silane coupling agent: TESP (Si 69, available from Evonik)
- Zinc oxide: Zinc Oxide III (available from Seido Chemical Industry Co., Ltd.)
- Stearic acid: stearic acid beads (available from Nippon Oil & Fats Co., Ltd.)
- Anti-aging agent: 6PPD (available from Flexsys)
- Sulfur: "Golden Flower" oil-treated sulfur powder (available from Tsurumi Chemical Industry Co., Ltd.)
- Vulcanization accelerator 1: vulcanization accelerator CBS (NOCCELER CZ-G, available from Ouchi Shinko Chemical Industrial Co., Ltd.)
- Vulcanization accelerator 2: Sanceller D-G (available from Sanshin Chemical Industry Co., Ltd.)
- Oil: Extract No. 4S (available from Showa Shell Sekiyu K.K.)

From the results shown in Table 1, it was found that the rubber compositions for tires of Examples 1 to 5 achieved superior tensile stress at 100% deformation, superior tensile stress at 300% deformation, superior tensile strength at break, and superior tensile elongation at break compared to those of the rubber composition for tires of Standard Example 1.

It was found that the rubber composition for tires of Comparative Example 1 exhibited inferior tensile stress at 100% deformation, inferior tensile stress at 300% deformation, inferior tensile strength at break, and inferior tensile elongation at break compared to those of rubber compositions for tires of Examples 1 to 5 and those of rubber composition for tires of Standard Example 1.

It was found that the rubber composition for tires of Comparative Example 2 exhibited inferior tensile stress at 100% deformation, inferior tensile stress at 300% deformation, inferior tensile strength at break, and inferior tensile elongation at break compared to those of rubber compositions for tires of Examples 1 to 5 and those of rubber composition for tires of Standard Example 1.

The invention claimed is:

1. A rubber composition for a tire, comprising from 1 to 100 parts by mass of an organic microparticle having an average particle size of 0.001 to 5 µm and having a crosslinked structure per 100 parts by mass of a diene rubber,
   the organic microparticle being a crosslinked microparticle of a copolymer formed from at least two types of segments having repeating units that are different each other,
   the at least two types of segments being formed from an oligomer or prepolymer having a functional group and having a molecular weight of 500 to 20000, and
   the functional group forming a crosslinked structure between the at least two types of segments.

2. The rubber composition for a tire according to claim 1, further comprising from 1 to 100 parts by mass of carbon black and/or a white filler per 100 parts by mass of the diene rubber.

3. The rubber composition for a tire according to claim 1, wherein the crosslinked structure of the organic microparticle is a crosslinked structure formed by allowing the functional group to crosslink in between the at least two types of segments in a dispersion medium formed from water or an organic solvent.

4. The rubber composition for a tire according to claim 1, wherein the crosslinked structure of the organic microparticle is a crosslinked structure formed by allowing the functional group to crosslink in between the at least two types of segments in a dispersion medium formed from a rubber component.

5. The rubber composition for a tire according to claim 4, wherein the rubber component is a same type as at least one part of the diene rubber.

6. The rubber composition for a tire according to claim 1, wherein at least one of the segments further has at least one selected from the group consisting of a sulfur atom, a mercapto group, a thioether bond, and a polysulfide bond.

7. The rubber composition for a tire according to claim 6, further comprising from 1 to 100 parts by mass of carbon black and/or a white filler per 100 parts by mass of the diene rubber.

8. The rubber composition for a tire according to claim 7, wherein the crosslinked structure of the organic microparticle is a crosslinked structure formed by allowing the functional group to crosslink in between the at least two types of segments in a dispersion medium formed from water or an organic solvent.

9. The rubber composition for a tire according to claim 7, wherein the crosslinked structure of the organic microparticle is a crosslinked structure formed by allowing the functional group to crosslink in between the at least two types of segments in a dispersion medium formed from a rubber component.

10. The rubber composition for a tire according to claim 9, wherein the rubber component is a same type as at least one part of the diene rubber.

11. A pneumatic tire comprising a tire tread formed from the rubber composition for a tire described in claim 1.

12. A pneumatic tire comprising a tire tread formed from the rubber composition for a tire described in claim 10.

* * * * *